Jan. 11, 1966  J. D. HANKS  3,228,112
LAYOUT DEVICE
Filed Jan. 7, 1964

INVENTOR.
JEFF D. HANKS
BY John R. Walker, II
Attorney

United States Patent Office 3,228,112
Patented Jan. 11, 1966

3,228,112
LAYOUT DEVICE
Jeff D. Hanks, 3348 E. Rosita Circle, Memphis, Tenn.
Filed Jan. 7, 1964, Ser. No. 336,257
9 Claims. (Cl. 33—189)

This invention relates generally to layout devices and particularly to such devices as are used to locate and mark circularly spaced points on a workpiece.

An object of the present invention is to provide a relatively simple tool or attachment device, for use with a lathe or the like, for accurately locating and marking circularly spaced points on work material held in the head stock of the lathe, the attachment device being mounted on the tail stock of the lathe and operable for point marking the material with a circular series of points which can be spaced equidistantly from and equiangularly about the lathe spindle axis.

A further object is to provide such a tool that is useful for inscribing circles on a workpiece.

A further object is to provide a versatile tool which can be readily adjusted to facilitate the marking of a wide range of angularly spaced points and for marking both large and small circles of points.

A further object is to provide a sturdy and accurate point marking tool for consistently marking each point precisely from the center axis of the workpiece or from the center axis of the lathe center.

A further object is generally to improve the design and construction of layout devices.

The means by which the foregoing and other objects of the present invention are accomplished and the manner of their accomplishment will be readily understood from the following specification upon reference to the accompanying drawings, in which.

Figure 1:
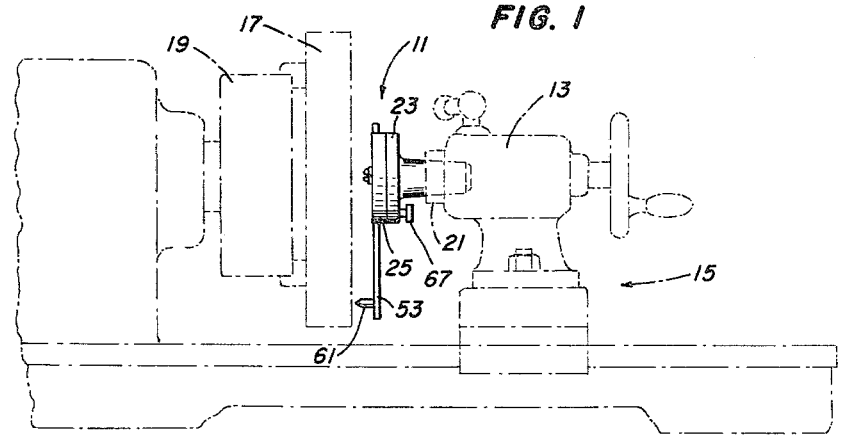
FIG. 1 is an environmental view of the device as in use, with the lathe shown in broken lines.

Referring now to the drawings in which the various parts are indicated by numerals, the device of the present invention, indicated as at 11 in FIG. 1, is shown positioned on the tail stock 13 of a lathe 15 and with the workpiece of material 17 fixedly attached to the lathe chuck 19.

It is contemplated that the device be usable with tools other than a lathe and with attachment means other than the mating Morse tapered parts as illustrated. However, in the following description, and as shown in the drawings, the device will be disclosed as being in a horizontal position and attached in a standardized way to the hollow Morse tapered ram 21 of lathe 15. The device will further be described for clarification as having a forward end (to the left in FIGS. 1 and 2) and a center axis which is coincident with the lathe center axis.

Device 11 includes two principal members, a fixed member 23 which is fixedly attached to ram 21 of the lathe, and a movable member 25 which is coaxially and pivotally attached to the forward end of fixed member 23. Member 23 preferably includes a tapered base portion 27 removably received in ram 21 of the lathe, and a flanged portion 29 attached to and circularly projecting from the forward end of base portion 27. Base portion 27 includes a thimble part 31 and a barrel part 33 which is disengageably connected to thimble part 31 by respective internal, external threaded portions 35, 37 of thimble 31 and barrel 33.

Movable member 25 is preferably disc-shaped and of a diameter which corresponds with the diameter of flanged portion 29 of fixed member 23. Member 25 is coaxially extendable from and pivotally connected on the forward end of member 23, and this connection preferably is as follows: A threaded aperture 39 is provided in the central portion of movable member 25. Bore and counterbore openings 41, 43, respectively, are provided through the central portion of fixed member 23. A pin 45 having a shouldered and threaded distal end 47 slidably and turnably extends through bore opening 41, is threadedly received in threaded aperture 39, and pivotally mounts member 25 from member 23. A coiled compression spring 49 is carried around the shank portion of pin 45 and is received in counterbore opening 43 of member 23. Spring 49 interengagingly abuts the shouldered bottom of counterbore opening 43 and head 51 of pin 45, and yieldably urges members 23, 25 together.

Figure 2:
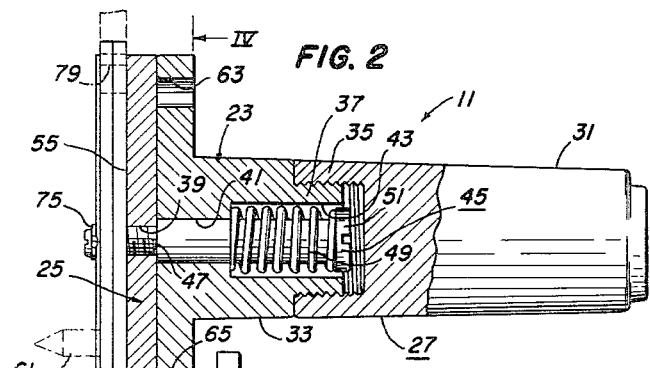
FIG. 2 is a view of the device positioned as in FIG. 1 with sectionalized portions broken away and removed for purposes of clarity.
Figure 3:
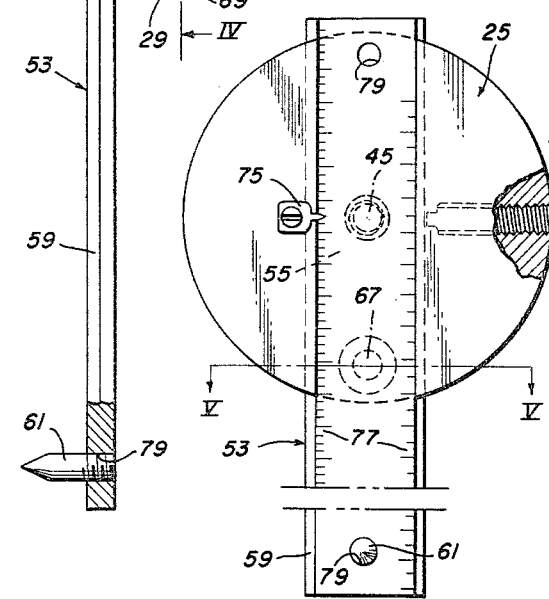
FIG. 3 is an end view, as viewed from the left of FIG. 2.
Figure 5:
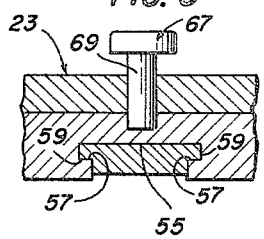
FIG. 5 is a sectional view taken as on the line V—V of FIG. 3.
Figure 4:
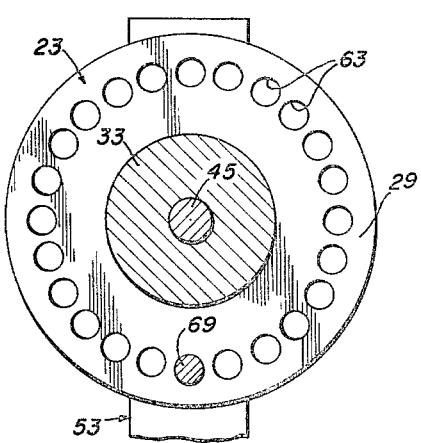
FIG. 4 is a cross-sectional view taken as on the line IV—IV of FIG. 2

An elongated bar 53 of substantially rectangular cross-section is perpendicularly arranged relative to movable member 25 and is slidably attached thereto. Oppositely disposed pairs of mating-step surfaces provided respectively on movable member 25 and elongated bar 53 attach these two parts together. A groove 55 is formed diametrically across the end face of movable member 25, as is best seen in FIGS. 2 and 3. The oppositely disposed edges of groove 55 are provided respectively with internal step surfaces 57. External step surfaces 59 disposed along the opposite edges of bar 53 mate and coactingly engage the internal step surfaces 57 of groove 55 and slidably attach bar 53 to member 25.

Means is provided for marking workpiece 17 and preferably comprises a center punch 61 threadedly attached adjacent an end of elongated bar 53. Center punch 61 is preferably of hardened steel and is attached as best seen in FIG. 2. Punch 61 extends parallel with the center axis of the lathe 15 and, as so mounted, is suitably arranged for marking the surface of material disposed in a vertical plane. However, it is contemplated that additional adaptations of the tool may be provided wherein the tool may be used for marking along the rim portion of a piece of material and with the mark being perpendicular to the center axis of the lathe. Preferably several lengths of punches, as punch 61, are provided for marking variously shaped workpieces of material.

A plurality of circularly spaced holes 63 of substantially the same size are provided adjacent the outer edge of flange portion 29 of fixed member 23. A single socket hole 65 of the same size as one of holes 63 is provided in movable member 25. Socket hole 65 is a like distance from the center axis of the tool as are each of the circularly spaced holes 63.

A removable lock pin 67 is provided for fixedly positioning the relative turning movement of fixed member 23 and movable member 25. Lock pin 67 includes a shank portion 69 and a head portion 71. Shank portion 69 is preferably only slightly less in diameter than are holes 63, 65, and thereby locks or closely limits the relative movement of members 23, 25. Adjacent holes of the plurality of spaced holes 63 are preferably 15 degrees apart. Thus, with the selective positioning of fixed member 23 and movable member 25 and with the manipulation of lock pin 67, the desired angular location of various work markings may be obtained.

The radial distance of center punch 61 from the center axis of the device, and thus the radial location of the punch mark from the center axis of workpiece 17, is obtained by sliding bar 53 to carry punch 61 towards and away from movable member 25. A lock screw 73 is threaddedly fitted in movable member 25 and is disposed perpendicular to bar 53. The manipulation of lock screw 73 positionably locks the sliding movement of bar 53 to a desired radial distance.

To aid in measuring or determining the radial distance of the punch marks from the center axis of the device, a pointer 75 and scale 77 are provided respectively on movable member 25 and bar 53. Aligning pointer 75 with a desired mark of scale 77 thus provides means for quickly determining the radial distance of the punch mark from the center axis of the workpiece 17. As will be noted in FIG. 3, a threaded aperture 79 is provided in each end of bar 53, and also two scales are provided respectively along the oppositely disposed edge portions of bar 53. It is contemplated that the device may be used with different units of measure. Thus, the two scales are provided, one in inches and the other in decimals or metric measurements. The oppositely disposed threaded apertures 79 in the respective ends of bar 53 coact with a respective one of scales 77. Thus, turning elongated bar 53 end for end places a desired one of scales 77 adjacent pointer 75, and by threadedly inserting center punch 61 in a desired one of apertures 79, various applications of the device and markings on a workpiece may be obtained.

It is though that from the foregoing description of the various parts, the use of the tool is apparent. However, for completeness of disclosure, the use will be further described as follows:

The workpiece 17 to be marked is first centered or positioned accurately about the lathe mandrel or spindle, as in chuck 19 shown in FIG. 1. The chuck and thus the workpiece are then locked securely to prevent rotation. With tail stock 13 of lathe 15 rearward or away from the workpiece 17, the desired radial distances of the point marks to be made are determined by aligning pointer 75 with a desired mark on scale 77. Lock screws 73 is then turned inward and fixedly positions bar 53 and center punch 61. The tail stock 13 is then moved forward toward workpiece 17 until the pointed end of center punch 61 just contacts the surface to be marked. Lock pin 67 is then inserted in a desired one of holes 63 and into socket 65. The rearward end of center punch 61, or the back side portion of bar 53, is then struck lightly with a hammer, thus establishing a mark on the surface of workpiece 17. Pin 67 is then removed from the device and placed in another of holes 63 at at desired angle from the hole used in establishing the first mark. While holding forward on pin 67, movable member 25 is turned until socket 65 aligns with pin 67 and the pin seats in the bottom of the socket. Center punch 61, or the back side of bar 53 adjacent punch 61, is then struck lightly with a hammer, as was done in the first marking, thus establishing a second mark. The above simple actions are done consecutively until the required number of marks are established on the workpiece.

When the radial distances of the marks to be made are less than the radial distances of members 23, 25, or, when using the tool for marking points that are a short distance from the center axis and the center punch 61 is disposed so that it cannot be struck directly with a hammer, as was above described, a somewhat different procedure is used. Thus, for short radii markings, and when the device is in a position as shown in broken lines in FIG. 2, lock pin 67 is struck with the manner to establish a point mark rather than directly striking center punch 61. Referring to FIG. 2, it will be seen that upon striking the head portion 71 of lock pin 67, the force of the blow will be transmitted through movable member 25, bar 53, and to the point of center punch 61 to mark the workpiece.

It will be understood that if it is desired to inscribe a circle on the workpiece, the tail stock 13 is moved forward toward workpiece 17 until the pointed end of center punch 61 contacts the surface of the workpiece. Then, relative rotation of workpiece 17 and member 25 is accomplished either by removing pin 67 and rotating member 25 or by rotating workpiece 17 by the power of the lathe to cause the circle to be inscribed by the pointed end of center punch 61.

From the forgoing it is readily seen that the device of the present invention provides a very useful tool for accurately locating and marking desired layout points around an axis or around a single point. Moreover, the present invention provides a sturdy and durable tool that does not require considerable skill or practice to use, and a versatile tool which is applicable for many layout or point marking jobs.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A layout device comprising a first member having a center axis, a second member having a center axis, means interacting between said first member and said second member for movably supporting said second member coaxially from said first member for turning movement of said second member relative to said first member and for extendable movement of said second member from a normal position adjacent said first member to extended positions away from said first member, resilient means contacting said means interacting between said first member and said second member for urging said second member into said normal position, bar means movably attached to said second member and including work marking means extendable from adjacent said axis of said second member to positions radially outwardly therefrom, pin means contacting said second member for moving said second member away from said first member to said extended positions upon the striking thereof by a hammer or the like whereby said work marking means is adapted to be carried into contact with a workpiece adjacent thereto for the marking thereof.

2. A layout device comprising a first member provided with an axial bore, a second member including an axially extending pin, said pin being turnably and slidably mounted in said axial bore to turnably and extendably support said second member from said first member, said second member being extendable from a normal position adjacent said first member to extended positions away from said first member, an elongated bar slidably attached to said second member, a punch mounted on said bar, said bar being movable to carry said punch from adjacent said axially extending pin radially outwardly relative to said second member, said second member having a center axis coincident with the axis of said axially extending pin and having at least one socket hole therein adjacent said first member, said first member having a plurality of holes extending parallel with and arranged around said axial bore, a lock pin removably received in one of said plurality of holes and in said socket hole for selectively positioning said first and second members, said lock pin extending outwardly from said first member in position for striking by a hammer or the like to move said punch into contact with a workpiece adjacent thereto for the marking thereof.

3. A point locating and marking device for use with a lathe or other such machine having relatively fixable work and tool holders, said device comprising a first member having a center axis, said first member being fixedly secured coaxially to the tool holder of the lathe, a second member having a center axis, means coaxially connecting said second member to said first member, said second member being turnable and axially displaceable relative to said first member, first positioning means interengaging said first and second members for fixedly positioning the turning movement of said second member relative to said first member, bar means movably attached to said second member and extendable substantially perpendicular from said axis of said second member, said bar means and said second member being turnable and axially displaceable together, second positioning means interengaging said second member and said bar means for fixedly positioning the extension of said bar means, and work marking means adapted to be struck with a hammer and operable with the axial displacement of said second member and said bar means for marking a point on the workpiece of material fixedly held in the work holder part of the lathe or the like.

4. The device of claim 3 in which said first positioning means comprises a circular plurality of open holes in said first member equidistantly spaced from said center axis thereof, a socket hole in said second member, and a lock pin removable from and selectively insertable in a desired one of said plurality of socket holes of said first member and in said hole of said second member.

5. The device of claim 3 in which said second positioning means comprises a lock screw threadedly fitted in said second member and turnable respectively inwardly and outwardly for lockingly engaging or releasably disengaging said bar means.

6. The device of claim 3 in which said work marking means comprises a pointed center punch mounted from said bar means and adapted to be struck with a hammer for marking a point on a workpiece of material.

7. A point locating and marking device for use with a lathe or other such machine having relatively fixable tool and work holders, said device comprising a first member having a center axis fixedly secured coaxially to the tool holder of the lathe and having a plurality of holes extending parallel with and equiangularly arranged around said center axis, a second member having a center axis and at least one socket therein, coaxially connecting said second member to said first member, said second member being turnable and axially displaceable relative to said first member, a lock pin removably received in one of said plurality of holes and in said socket hole for selectively positioning said first and second members, an elongated bar, bar attachment means positionably attaching said bar to said second member and substantially perpendicularly to the coaxial axis of said first and second members, said bar and said second member being turnable and axially displaceable together, and work marking means adapted to be struck with a hammer and operable with the axial displacement of said bar for marking a point on a workpiece of material fixedly held in the work holder part of the lathe or the like.

8. A point locating and marking device for use with a lathe or other such tool having relatively fixable work and tool holders; the device comprising a first member secured to the tool holder of the lathe having a center axis and having a plurality of holes extending parallel with, spaced certain distances from, and equiangularly arranged about said center axis; a second member having a center axis, connecting means coaxially supporting and connecting said second member from said first member, said second member being extendable axially from and relatively pivotable to said first member, an elongated bar, attachment means positionably attaching said bar to said second member substantially perpendicularly of the coaxial axis of said first and second members, said bar and said second member being turnable and axially extendable together, and work marking means secured to said bar and adapted to be actuated by being struck with a hammer; said bar, said second member and said punch-marking means being axially extended by the force of the hammer blow for establishing a point on a workpiece of material secured in the work holder part of the lathe.

9. A point locating and marking device for use with a lathe or other such machine having relatively fixable work and tool holders, said device comprising a first member having a center axis and a circumferential flanged portion and having a plurality of holes disposed circularly around said flanged portion with said holes extending through said flanged portion and disposed respectively substantially parallel to the axis of said first member, said first member being fixedly securable coaxially to the tool holder of the lathe, a second disc-shaped member having a center axis and a single socket hole, means coaxially connecting said second member and said first member, said second member being turnable and axially displaceable relative to said first member, spring means for urging said first and second members together, a removable pin extending through a selected one of said plurality of holes in said first member and received in said socket hole in said second member, an elongated bar, means attaching said elongated bar from said second member with said elongated bar extending substantially perpendicular to the axis of said second member and positionable relative to the axis, and work marking means including a pointed center punch fixedly secured to said bar; said device being adapted to be operable by striking said pin with a hammer to cause axial displacement of said second member, said bar and said center punch to mark a point on a workpiece of material held in the lathe.

References Cited by the Examiner
UNITED STATES PATENTS 2,844,175 7/1958 Zern.
2,978,814 4/1961 Burhans _____ 33—189

FOREIGN PATENTS 52,436 11/1936 Denmark.

ROBERT B. HULL, *Primary Examiner.*

ISAAC LISANN, *Examiner.*

WM. D. MARTIN, *Assistant Examiner.*